June 18, 1929. H. J. CARLSON 1,718,111
EGG BEATER
Filed March 3, 1928
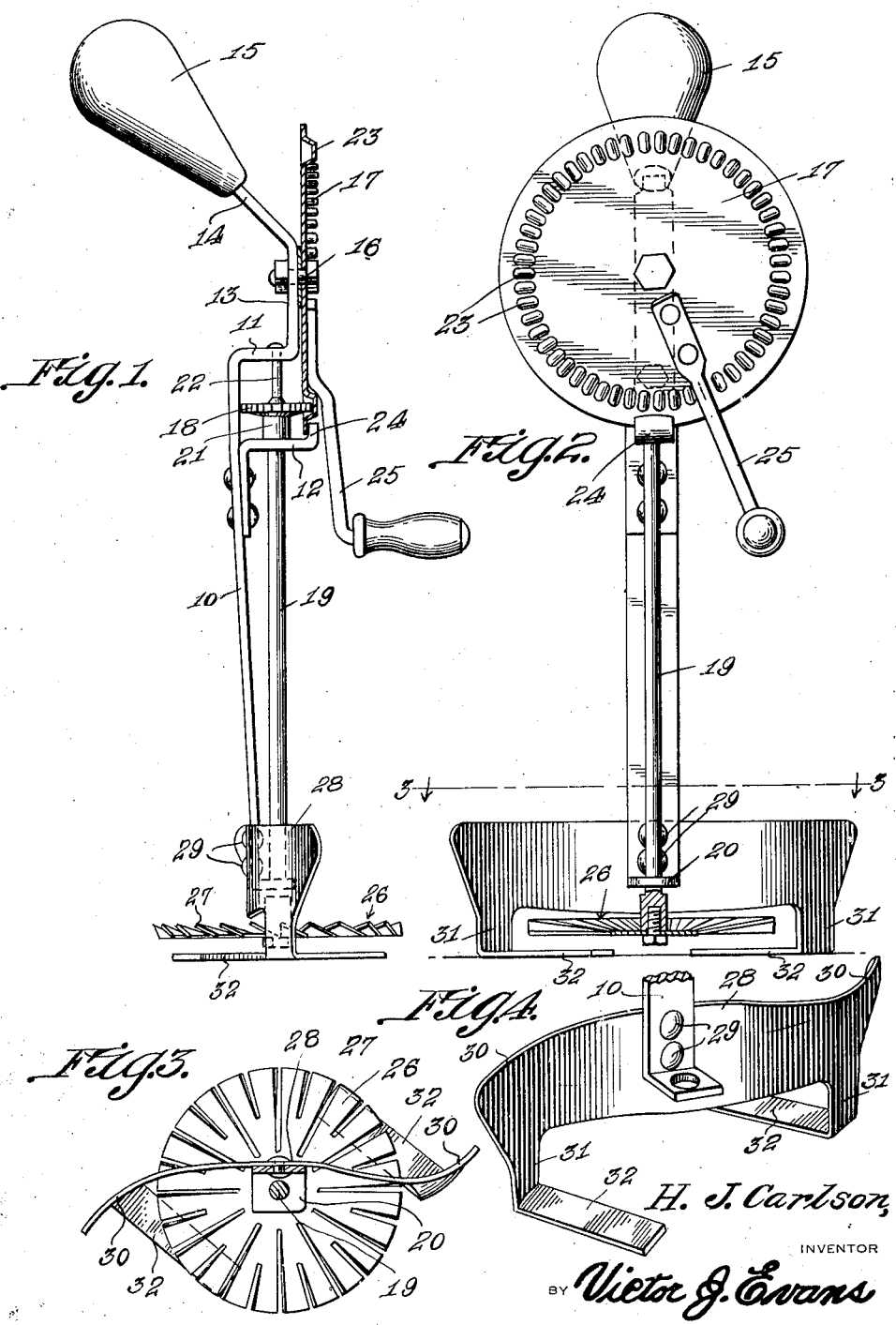
H. J. Carlson,
INVENTOR
BY Victor J. Evans
ATTORNEY Patented June 18, 1929.

1,718,111

UNITED STATES PATENT OFFICE.

HARRY J. CARLSON, OF GROVE CITY, PENNSYLVANIA.

EGG BEATER.

Application filed March 3, 1928. Serial No. 258,920.

This invention relates to culinary articles and has especial relation to beaters for beating or whipping eggs and cream.

An object of the present invention is to provide an article of this character which will eliminate the usual spattering and splashing and consequent waste of material, means being provided for catching the liquid material as it is thrown by centrifugal force from the beater element, and returning said liquid material to said element, so that in addition to the elimination of splashing and spattering, the material may be beaten or whipped in a relatively short time.

Another object of the invention is the provision of means for supporting the beater element spaced above the bottom of a container or receptacle with which the beater is used, the supporting means enabling the beater to stand in an upright position, whether in or out of use.

With the above and other objects in view, the invention further includes the following novel features and details of construction, to be hereinafter more fully described, illustrated in the accompanying drawings and pointed out in the appended claims.

In the drawings:—

Figure 1 is an elevation partly in section illustrating a beater constructed in accordance with the invention.

Figure 2 is an elevation at rightangles to Figure 1.

Figure 3 is a sectional view on the line 3—3 of Figure 2.

Figure 4 is a detail perspective view of the combined deflecting and supporting member.

Referring to the drawings in detail wherein like characters of reference denote corresponding parts, the invention is shown as comprising a frame which includes a leg 10 having rightangularly arranged spaced upper and lower members 11 and 12 respectively, the upper member 11 being provided with an extension 13 which terminates in a handle 14. This handle extends at an obtuse angle with respect to the extension 13 and carries a hand grip 15.

Rotatably mounted upon the extension 13 by means of a shaft 16 is a gear 17. This gear is engaged by a pinion 18 which is positioned between the upper and lower members 11 and 12. The pinion 18 is secured to a shaft 19 which has a bearing in the lower member 12 of the frame and in a foot piece 20 which extends at an angle from the lower end of the leg 10. The pinion 18 carries a hub 21 which bears against the member 12, while a shank 22 which is carried by the member 11 engages the upper end of the shaft 19. The gear 17 is provided with an annular offset 23 within which are arranged the teeth engaged by the pinion 18. The member 12 is provided with a rightangled lip 24 which acts to guide the gear 17. A handle 25 is secured to this gear so as to provide means for operating the beater.

Secured to the lower end of the shaft 19 below the foot piece 20 is a disk 26 which is provided with radially disposed spaced fins 27. This disk with its fins provides a beater element which is rotated by the operation of the shaft 19.

Extending across the upper face of the beater element or disk 26 is a bar 28. This bar is secured to the lower end of the leg 10 as shown at 29. The bar extends substantially diametrically across the disk and has its outer oppositely curved extremities 30 positioned beyond the disk. Extending downwardly from the bar 28 are relatively short legs 31 which carry feet 32. These feet are arranged parallel with the disk 26 and extend beneath said disks and are preferably parallel with one another so as to provide a support for the beater.

In use or out of use, the beater will be firmly supported by the feet 32, while rotation of the beater element will throw the liquid material outward against the oppositely curved extremities 30 of the bar 28. These curved extremities provide baffle or deflecting elements and act to return the material to the beater element. Splashing and spattering is thus eliminated and in addition, the material is beaten or whipped in a relatively short time.

The invention is susceptible of various changes in its form, proportions and minor details of construction and the right is herein reserved to make such changes as properly fall within the scope of the appended claims.

Having described the invention what is claimed is:—

1. A device of the character described comprising a frame, a shaft mounted for rotation thereon, means to rotate the shaft, a beater element carried at one end of the shaft, and a combined deflecting and supporting member secured to the frame and including relatively broad vertically disposed faces extending diametrically across and beyond the edge of the beater element.

2. A device of the character described comprising a frame, a shaft mounted for rotation thereon, means to rotate the shaft, a beater element carried at one end of the shaft, a deflecting bar secured to the frame and extending across one face of the beater element, legs extending downwardly from the bar, and feet extending from the legs below the beater element to provide a support for the device.

3. A device of the character described comprising a frame, a shaft mounted for rotation thereon, means to rotate the shaft, a bar secured to the frame and extending across one face of the beater element, oppositely curved extremities at the ends of the bar beyond the beater element and providing deflecting elements, legs extending downwardly from the bar, and feet extending from the legs below the beater element to provide a support for the device.

In testimony whereof I affix my signature.

HARRY J. CARLSON.